United States Patent
Greenberg

[15] 3,635,765
[45] Jan. 18, 1972

[54] METHOD OF MAKING E M F CELL
[72] Inventor: Jacob Greenberg, Pepper Pike, Ohio
[73] Assignee: The United States of America as represented by the Administrator of the National Aeronautics and Space Administration
[22] Filed: June 5, 1970
[21] Appl. No.: 57,399

Related U.S. Application Data
[62] Division of Ser. No. 787,911, Dec. 30, 1968.

[52] U.S. Cl. .......................... 136/83 R, 136/100 R, 136/175
[51] Int. Cl. ........................................................ H01m 31/00
[58] Field of Search .................. 136/83, 90, 6, 100, 175–176, 136/86, 137

[56] References Cited

UNITED STATES PATENTS

| | | | |
|---|---|---|---|
| 2,718,539 | 9/1955 | Bradshaw et al. | 136/83 |
| 3,238,437 | 3/1966 | Foster et al. | 136/83 |
| 3,463,670 | 8/1969 | Rao et al. | 136/83 |

*Primary Examiner*—Anthony Skapars
*Attorney*—N. T. Musial, G. E. Shook and G. T. McCoy

[57] ABSTRACT

A heat-activated electromotive force (e.m.f.) cell having an anode formed of aluminum and a cathode comprising an oxidizing material such as sulfur. The cathode material is supported in a container or in a matrix such as porous carbon. An aluminum salt layer electrolyte such as AlCl separates the anode from the cathode. To minimize vaporization of the aluminum salt, an alkali halide salt may be mixed therewith. The cell may be operated at temperatures up to a point where either the cathode material or the electrolyte is molten.

2 Claims, 4 Drawing Figures

PATENTED JAN 18 1972 3,635,765

INVENTOR
JACOB GREENBERG

BY

Norman T. Musial
ATTORNEYS the cell.

METHOD OF MAKING E M F CELL

STATEMENT OF COPENDENCY

This is a division of application Ser. No. 787,911 filed Dec. 30, 1968, now U.S. Pat. No. 3,573,986.

ORIGIN OF THE INVENTION

This invention described herein was made by an employee of the United States Government and may be manufactured and used by or for the Government of the United States of America for governmental purposes without the payment of any royalties thereon or therefor.

BACKGROUND OF THE INVENTION

This invention relates to heat-activated e.m.f. cells and is directed more particularly to a heat-activated e.m.f. cell having an aluminum anode.

Because of its low-equivalent weight, relatively high-energy density, ease of handling, and availability in many inexpensive forms, aluminum is a very desirable material for use as battery anodes. In the past, some e.m.f. cells have been constructed using aluminum anodes with aqueous electrolytes. Such e.m.f. cells have not been successful because of corrosion which occurs on the aluminum anode. This corrosion causes unacceptably low efficiency in aluminum anode cells.

Accordingly, it is an object of the invention to provide an improved aluminum anode cell.

It is another object of the invention to provide an aluminum anode cell having high efficiency.

Still another object of the invention is to provide an aluminum anode cell having a relatively thin electrolyte of large area.

A further object of the invention is to provide a heat-activated, aluminum anode cell which may be operated at temperatures at which the electrolyte may be either solid or molten.

An additional object of the invention is to provide an e.m.f. cell having an aluminum anode which does not corrode.

It is yet another object of the invention to provide a cell of the above type in which the cathode may be either solid or molten.

In summary, the invention provides a heat-activated cell using an aluminum anode. The cell operates at high efficiency by using a thin, heated electrolyte comprising at least one aluminum salt. Depending on the materials used for the cathode and the electrolyte, the cell may be operated with either the electrolyte or the cathode in a molten state.

DESCRIPTION OF A PREFERRED EMBODIMENT

Figure 1:
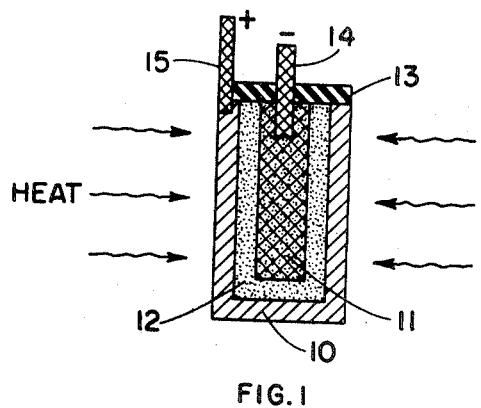
FIG. 1 is a cross-sectional view of one configuration of a cell embodying the invention.

Referring now to FIG. 1, it will be seen that a cell constructed in accordance with the invention may include an aluminum container 10 which serves as the anode of the cell. A post 11 formed of porous carbon saturated with sulfur is disposed in the container 10 to serve as a cathode. The sulfur must be substantially completely and evenly distributed in the porous carbon of the post 11 in order for the post to function properly as a cathode. The porous carbon thus serves as a matrix or holder-support for the sulfur cathode material. Because methods of saturating porous carbon with sulfur are well known to those skilled in the art, such methods will not be described herein.

If desired, the cathode post 11 may be formed of any metal which: may be made in porous form; is lower in the electromotive series than aluminum; and does not react chemically with the sulfur or any other suitable cathode materials used to saturate the cathode post 11. Other suitable materials which may replace the sulfur in the post 11 include any $O_2$ or $Cl$ producing materials, as for example, halogen compounds or organic compounds containing oxygen. In general, the cathode may be any suitable oxidizing material which will react with aluminum to form an aluminum salt.

To the end that the cell shown in FIG. 1 will produce a relatively high-current density at high efficiency, a thin electrolyte 12 is disposed between the cathode post 11 and the aluminum container 10 and is heated by heat applied to the cell. An electrolyte thickness of one-eighth inch is sufficiently thin for the structure shown in FIG. 1. In accordance with the invention, the electrolyte 12 comprises at least one aluminum salt. At least one alkali halide salt may be added to the aluminum salt to minimize vaporization of the aluminum salt. Because it is generally desirable to operate a heat-activated cell at the lowest possible temperature, and because of considerations of economy, availability, and ease of handling, a eutectic mixture of AlCl-NaCl has been found to be the most suitable electrolyte. With this particular electrolyte mixture or with any aluminum halide salt-alkali salt mixture, the cell is normally operated in a temperature range of from about 50° C. to about 100° C. by externally applied heat. However, the cell may be operated up to temperatures greater than the melting point of the electrolyte mixture if desired. The uppermost practical limit is about 600° C. which is well below the melting point of the aluminum anode.

The cell of FIG. 1 is completed by a cover plate 13 and electrodes 14 and 15. The cover plate 13 is an electrical insulating material such as ceramic. The electrodes 14 may be either carbon or any suitable metal compatible with the materials used in the cathode post 11, the anode 10, and the electrolyte 12.

Figure 2:
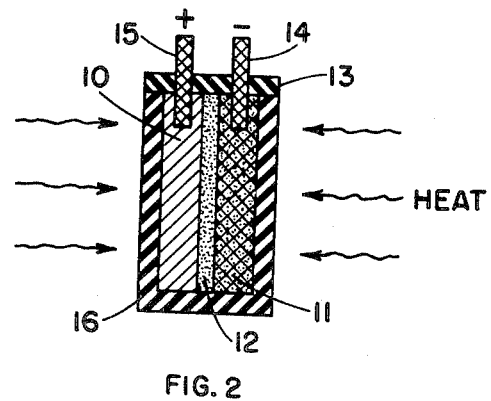
FIG. 2 is a cross-sectional view of a cell in which the anode, cathode, and electrolyte are in the form of side-by-side plates.

FIG. 2 illustrates an alternate arrangement of the cell shown in FIG. 1 and like parts are identified by like numerals. In FIG. 2, the anode 10, the cathode 11, and the electrolyte 12 are in the form of side-by-side plates. The electrolyte 12 is positioned between the anode 10 and the cathode 11. A suitable container 16 made of electrically nonconductive material is disposed around the anode 10, the cathode 11, and the electrolyte 12 to hold them in place.

Figure 3:
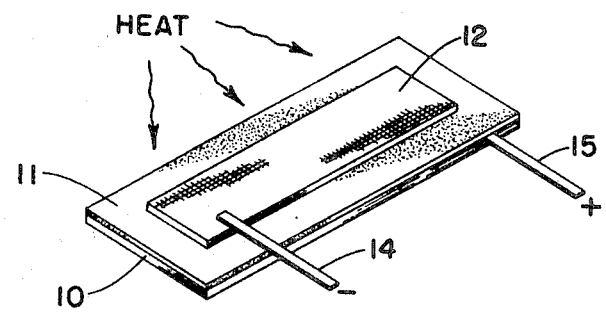
FIG. 3 is a pictorial drawing of a rollable cell embodying the invention.

FIG. 3 pictorially shows another possible arrangement of a cell constructed in accordance with the invention. Parts in FIG. 3 are identified by numerals corresponding to like parts in FIGS. 1 and 2. In the cell of FIG. 3, the anode 10 is a sheet of aluminum foil. The aluminum salt-alkali halide electrolyte 12 is coated onto the aluminum foil as a thin layer. This layer is preferably less than 1 millimeter thick. The cathode 11 comprises a sulfur-saturated graphite cloth placed against the electrolyte 12. Suitable metal electrodes 14 and 15 of carbon or metal are attached to the cathode 11 and the anode 10, respectively. The cell shown in FIG. 3 advantageously may be either folded or rolled and placed in a hermetically sealed container such as a foil pouch.

A cell constructed as shown in FIG. 3 and having a AlCl–NaCl electrolyte will deliver about 10 milliamperes per square centimeter (ma./cm.$^2$) of electrolyte area when operated at a temperature slightly below 150° C., the melting point of the electrolyte. The cell delivers about 25 ma./cm.$^2$ when it operates at about 200° C. The e.m.f. in both cases is approximately 1.2 volts.

Figure 4:
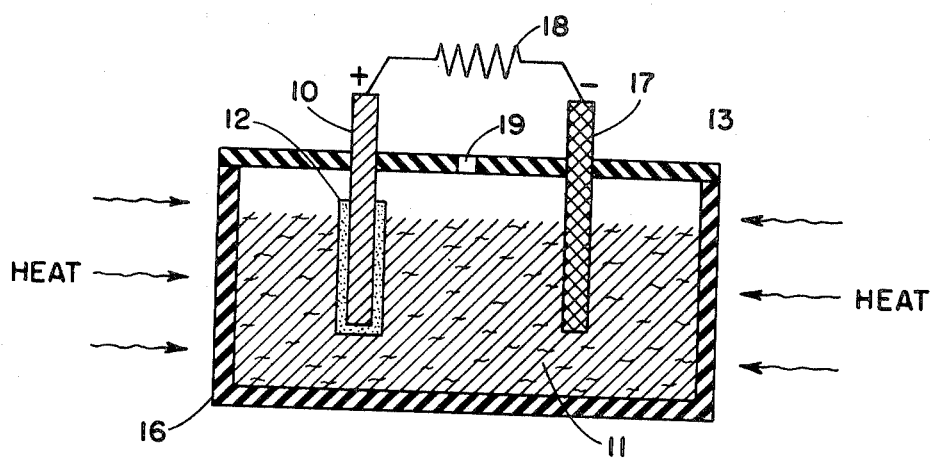
FIG. 4 is a cross-sectional view of still another form of cell embodying the invention.

FIG. 4 shows still another form of cell embodying the invention. Parts corresponding to those in FIGS. 1, 2, and 3 are identified by like numerals. The cell of FIG. 4 includes an anode 10 in the form of an aluminum rod which extends into a container 16 through a cover plate 13 made of an electrically insulating material. The cathode 11 is a molten-mixture comprising sodium sulfide, sulfur, and water. An electrode 17 of electrically conductive material extends through the cover plate 13 into the anode 11. The electrode 17 may be carbon or a metal which will not react with any of the other materials in the cell.

A current path such as a load in the form of a resistor 18 may be connected between the anode 10 and the electrode 17 to produce a heating effect in the cell. This heating helps sustain operation of the cell. A thin electrolyte 12 of aluminum sulfide is formed on the aluminum anode 10. The electrolyte also serves as a separator by preventing the cathode 11 material from contacting the anode 10. To allow hydrogen sulfide gas to escape as it accumulates around the electrode 17 during operation of the cell, a vent 19 is provided in the cover plate 13.

The cell shown in FIG. 4 is a primary cell and is not rechargeable. The cell is put into operation in the following manner. Commercial quality sodium sulfide is placed in the container 16. Heat is then applied to the container 16 causing the sodium sulfide to melt into its own water of hydration. This takes place when the sodium sulfide is heated to 50° C. or above. When the sodium sulfide is molten, it comprises sodium sulfide, sulfur, and water. The alumimum anode 10 and the carbon electrode 17 are then inserted into the molten sodium sulfide, sulfur, and water mixture which form the cathode 11. A protective coating of aluminum sulfide immediately forms on the aluminum anode 10. This coating serves as both a separator and an electrolyte.

As current flows between the anode 10 and the electrode 17 through the load 18, electrochemical action between the anode 10 and the cathode 11 progresses. Aluminum ions build up on the anode 10 while sulfide ions build up on the carbon electrode 17. The sulfide ions accumulating on the electrode 17 tend to reduce or at least limit the current capability or energy density of the cell. However, the sulfide ions will react with the water in the molten cathode to form $H_2S$. Accordingly, the cell may be made to provide a relatively high-current output by removing the $H_2S$ gas which forms at the electrode 17. To this end, the $H_2S$ is allowed to escape through a vent 19 provided in the cover plate 13.

By making the load 18 a relatively low resistance, a relatively high current will be transferred between the anode 10 and the electrode 17. This accelerates the electrochemical action taking place between the anode 10, the cathode 11, and the electrolyte 12 and produces heating. Thus, by selecting a load 18 of sufficiently low resistance, enough heat may be generated in the cell to make its operation self-sustaining. Consequently, it will be seen that, with a properly selected load 18, the exterior heat applied to the cell to initiate operation may now be removed. Of course, it will be understood by those skilled in the art that the selection of the load 18 will be affected by other considerations such as the size of the container 16 and the amount of cathode material 11, as well as the size of anode 10 and the electrode 17.

It will be understood that those skilled in the art may make changes and modifications to the foregoing heat-activated cell without departing from the spirit and scope of the invention as set forth in the claims appended hereto.

What is claimed is:

1. A method of making an e.m.f. cell comprising the steps of:

disposing sodium sulfide in a container;

heating said container and melting the sodium sulfide in its own water of hydration and forming a cathode consisting essentially of molten sodium sulfide, sulfur, and water mixture;

placing at least a portion of an aluminum body in said molten sodium sulfide, sulfur and water mixture and forming a layer of sodium sulfide on said aluminum body, said sodium sulfide serving as an electrolyte and said aluminum body serving as an anode; and placing at least a portion of a body of electrical conductor material in said sodium sulfide, said electrical conductor body serving as an electrode.

2. The method of claim 1 including the steps of providing a current path of predetermined resistance between said anode and said electrode producing heating in said cell and then removing the heat applied to said container.

* * * * *